(12) United States Patent
Kim et al.

(10) Patent No.: US 11,588,403 B2
(45) Date of Patent: Feb. 21, 2023

(54) BUCK-BOOST CONVERTING CIRCUIT

(71) Applicant: Silicon Works Co., Ltd., Daejeon (KR)

(72) Inventors: Seung Jin Kim, Daejeon (KR); Jae Seong Lee, Daejeon (KR); Jung Sik Kim, Daejeon (KR); Jeongjin Roh, Daejeon (KR); Ju Pyo Hong, Daejeon (KR); Ju Hyun Lee, Daejeon (KR)

(73) Assignee: Silicon Works Co., Ltd, Daejeon (KR)

( * ) Notice: Subject to any disclaimer, the term of this patent is extended or adjusted under 35 U.S.C. 154(b) by 108 days.

(21) Appl. No.: 17/128,532

(22) Filed: Dec. 21, 2020

(65) Prior Publication Data
US 2021/0194369 A1 Jun. 24, 2021

(30) Foreign Application Priority Data

Dec. 24, 2019 (KR) .......... 10-2019-0174230
Dec. 3, 2020 (KR) .......... 10-2020-0167358

(51) Int. Cl.
| | |
|---|---|
| *H05B 45/37* | (2020.01) |
| *H05B 45/375* | (2020.01) |
| *H05B 45/38* | (2020.01) |
| *H02M 3/158* | (2006.01) |
| *H05B 45/54* | (2020.01) |
| *H05B 45/325* | (2020.01) |

(52) U.S. Cl.
CPC ........ *H02M 3/1582* (2013.01); *H05B 45/325* (2020.01); *H05B 45/375* (2020.01); *H05B 45/38* (2020.01); *H05B 45/54* (2020.01)

(58) Field of Classification Search
CPC ...... H05B 45/10; H05B 45/325; H05B 45/37; H05B 45/3725; H05B 45/375; H05B 45/38; H05B 45/40; H05B 45/44; H05B 45/48; H05B 45/54; H02M 1/007; H02M 3/158; H02M 3/1582
See application file for complete search history.

(56) References Cited

U.S. PATENT DOCUMENTS

| | | | |
|---|---|---|---|
| 2013/0049599 A1* | 2/2013 | Logiudice | H05B 47/24 315/122 |
| 2014/0265890 A1* | 9/2014 | Ito | B60Q 1/00 315/186 |
| 2016/0366742 A1* | 12/2016 | Lee | H05B 45/48 |
| 2018/0056853 A1* | 3/2018 | Muramatsu | H05B 45/48 |

FOREIGN PATENT DOCUMENTS

| | | |
|---|---|---|
| JP | 2015-0510667 A | 6/2015 |
| JP | 2017-0135086 A1 | 1/2019 |
| KR | 2014-0079071 B1 | 6/2014 |

OTHER PUBLICATIONS

Linear Technology; "60V 2MHz Synchronous 4-Switch Buck-Boost LED Driver Controller"; www.linear.com/LT8391A; pp. 1-32.
(Continued)

*Primary Examiner* — Thai Pham
(74) *Attorney, Agent, or Firm* — Polsinelli PC

(57) ABSTRACT

Provided is a buck-boost converting circuit including an LED current regulator and bypass switches. The buck-boost converting circuit includes switches coupled in a matrix form in order to individually control a plurality of LEDs connected in series, an LED current regulator, and a circuit capable of buck-boost conversion.

20 Claims, 7 Drawing Sheets

(56) References Cited

OTHER PUBLICATIONS

Texas Instruments; "High-Brightness LED Matrix Manager for Automotive Headlight Systems"; SLUSBU2A—Sep. 2014—Revised Feb. 2016; pp. 1-52.
Texas Instruments; "LM3409, -Q1, LM3409HV, -Q1 P-FET Buck Controller for High-Power LED Drivers"; SNVS602L—Mar. 2009—Revised Jun. 2016; pp. 1-46.
Kovatchev, Emil; "Design of a MOSFET Bypass Switch for Individual Pixel Control in a Matrix LED Headlamp Application"; Proc XXVI International Scientific Conference Electronics; Sep. 13-15, 2017; pp. 1-4.
Erickson, Robert W., et al.; "Fundamentals of Power Electronics"; Kluwer Academic Publishers; 2000; http://site.ebrary.com/lib/nankai/Doc?id=10067440&page=1.

\* cited by examiner

BUCK-BOOST CONVERTING CIRCUIT

BACKGROUND

1. Technical Field

The present disclosure relates to a buck-boost converting circuit for light-emitting diode (LED) control, and more particularly, to a buck-boost converting circuit including an LED current regulator and bypass switches capable of constantly controlling currents of LEDs connected in series and individually controlling brightness of the LEDs.

2. Related Art

A buck-boost converting circuit is a circuit having both functions of a buck converter having an output voltage lower than an input voltage and a boost converter having an output voltage higher than an input voltage.

If a plurality of LEDs connected in series is used, a conventional buck-boost converting circuit has a disadvantage in that currents flowing into the LEDs are not individually controlled and must be controlled in batches.

The buck-boost converting circuit must be configured to be divided into a buck converter and a boost converter in order to have the functions of the buck converter and the boost converter and to individually control currents of the plurality of LEDs connected in series.

If the currents flowing into all of the LEDs connected in series are controlled in batches through one path, there are problems in that it is impossible not to selectively use only an LED at a specific location and it is always necessary to turn on all of the LEDs in batches. Therefore, there is a possibility that power consumption of a load will increase in proportion to an increase in the number of LEDs to be controlled.

If a buck-boost converting circuit is not configured as one buck-boost converting circuit but configured by being divided into a buck converter and a boost converter, the total efficiency of the circuit may be represented as the multiplication of efficiency of the boost converter $\eta_{Boost}$ and efficiency of the buck converter $\eta_{BUCK}$ as in Equation 1 below.

$$\eta_{MODULE} = \eta_{BOOST} \times \eta_{buck} \quad (1)$$

As described above, the total efficiency of the buck-boost converting circuit is represented as the multiplication of efficiencies of the two converters. Therefore, when the efficiency of one of the two converters is decreased, the total efficiency of the buck-boost converting circuit is suddenly decreased.

Accordingly, there is a possibility that the buck-boost converting circuit configured by being divided into the buck converter and the boost converter may have relatively low efficiency compared to a case where one buck-boost converter is used.

SUMMARY

Various embodiments provide a buck-boost converting circuit for efficiently controlling a plurality of LEDs connected in series.

Furthermore, various embodiments provide an LED current regulator for maintaining a current flowing into on both ends of an LED within a proper range and a buck-boost converting circuit capable of integrating and operating a buck mode and a boost mode.

Furthermore, various embodiments provide a buck-boost converting circuit for preventing the unnecessary power consumption attributable to excessive currents flowing into a plurality of LEDs connected in series, although all of the LEDs are turned off.

In an embodiment, a buck-boost converting circuit may include a plurality of light-emitting diodes (LEDs) connected in series, an LED matrix manager including bypass switches one-to-one corresponding to the respective LEDs and each coupled to both ends of a corresponding LED, and configured to control switching of the bypass switches in response to pulse width modulation (PWM) signals, respectively, a buck-boost converter region circuit configured to supply an output voltage to the plurality of LEDs in accordance with a buck mode and a boost mode, and an LED current regulator configured to control currents flowing into the plurality of LEDs.

In an embodiment, a buck-boost converting circuit is configured to provide an output voltage, corresponding to a buck mode or a boost mode, to a plurality of light-emitting diodes (LEDs) connected in series in response to control signals. The buck-boost converting circuit may include an LED matrix manager including bypass switches one-to-one corresponding to the respective LEDs and each coupled to both ends of a corresponding LED, and configured to control switching of the bypass switches in response to PWM signals, respectively, and provide a reference voltage belonging to a preset range, and a buck-boost controller configured to provide control signals for controlling the buck mode and the boost mode using the reference voltage so that the LED current regulator provides the output voltage for enabling the LED current regulator to operate in a saturation region.

DETAILED DESCRIPTION

Hereinafter, embodiments of the present disclosure are described in detail with reference to the accompanying drawings. Terms used in the present specification and claims should not be construed as having common or dictionary meanings, but should be construed as having meanings and concepts that comply with the technical spirit of the present disclosure.

Elements illustrated in embodiments and drawings described in this specification are embodiments of the present disclosure and do not represent all the technical spirit of the present disclosure. Accordingly, various equivalents and modification examples which may substitute the elements may be present at the time of filing this application.

Numerical values and the number of elements or circuits described in the specification of the present disclosure are also illustrative, and there may be more various increases and decreases in the numerical values and the number of elements or circuits in order to properly implement the technical spirit of the present disclosure.

Figure 1:
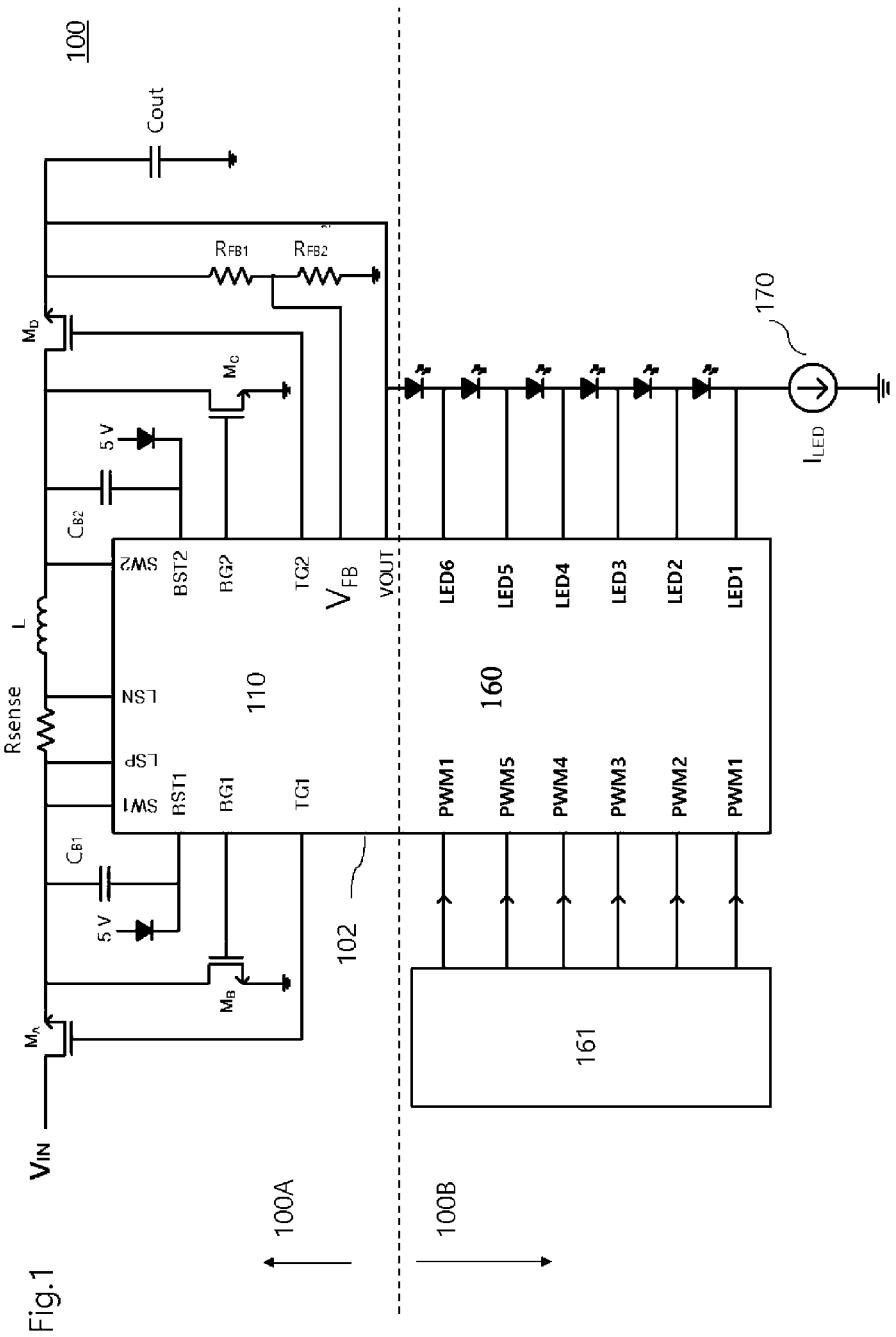
FIG. 1 is a circuit diagram illustrating a preferred embodiment of a buck-boost converting circuit according to the present disclosure.

An overall configuration of a buck-boost converting circuit 100 according to an embodiment of the present disclosure is described with reference to FIG. 1.

The buck-boost converting circuit 100 is for controlling the on or off of all or some of a plurality of LEDs (not illustrated) which act as loads and are connected in series.

The buck-boost converting circuit 100 is roughly divided into a buck-boost converter region 100A responsible for buck conversion and boost conversion and an LED current regulator region 100B.

The buck-boost converting circuit 100 includes a buck-boost converter 102 configured as a chip. The buck-boost converter 102 includes a buck-boost controller 110 corresponding to the buck-boost converter region 100A and an LED matrix manager circuit 160 corresponding to the LED current regulator region 100B.

In the following description, a pulse width modulation (PWM) generator 161 of the LED current regulator region 100B may be included in the buck-boost converting circuit 100 according to an embodiment of the present disclosure or may be a normal external circuit in some cases. Accordingly, a description of a detailed circuit and operation of the PWM generator 161 is omitted for convenience sake.

Circuit elements indicated in the buck-boost converter region 100A are described below.

Switches $M_A$, $M_B$, $M_C$, and $M_D$ indicated as transistors are elements switched for a buck operation and a boost operation. The switches $M_A$, $M_B$, $M_C$, and $M_D$ may be divided into buck mode switches $M_A$ and $M_B$ and boost mode switches $M_C$ and $M_D$.

Two Schottky diodes each applied with an input voltage of 5 V form two pairs along with a capacitor $C_{B1}$ and a capacitor $C_{B2}$, respectively. The pairs are elements for supplying a bootstrap voltage BTS1 or a bootstrap voltage BTS2 to the source or drain node of the high-side switches $M_A$ and $M_D$ at proper timing.

A sense resistor $R_{SENSE}$ is for sensing a voltage value or a current value between both terminals thereof. That is, the sense resistor $R_{SENSE}$ may be understood to provide a voltage obtained by sensing a current supplied to the plurality of LEDs through an inductor L. The inductor L is an element necessary to adjust a flow of a current in a buck operation and a boost operation. A current flowing into the inductor L is proportional to inductance.

$C_{OUT}$ means an output capacitor. An output voltage $V_{OUT}$ is applied to both ends of the output capacitor $C_{OUT}$. Some of the output voltage $V_{OUT}$ is proportionally fed back based on values of feedback resistors $R_{FB1}$ and $R_{FB2}$. In this case, the fed-back voltage corresponds to a feedback voltage $V_{FB}$.

The buck-boost controller 110 generates control signals TG1, BG1, TG2, and BG2 that are input to the gates of the switches $M_A$, $M_B$, $M_C$, and $M_D$ and that are necessary for a switching operation. Furthermore, the buck-boost controller 110 generates the control signals BST1 and BST2 for a bootstrap operation.

The feedback voltage VFB is input to the buck-boost controller 110. Furthermore, control signals necessary for a buck-boost operation, for example, signals SW1, LSP, LSN, and SW2 may be input to or output from both ends of the sense resistor $R_{SENSE}$ and the inductor L. Roles of the control signals SW1, LSP, LSN, and SW2 may be properly described, if necessary.

The output capacitor $C_{OUT}$ is an element necessary for current regulation when the buck-boost converting circuit 100 according to an embodiment of the present disclosure operates in a boost mode.

The buck-boost controller 110 included in the buck-boost converter region 100A and configured to control the buck mode and the boost mode and the elements included in the buck-boost converter region 100A and configured to provide an output voltage corresponding to an input voltage in the buck mode or the boost mode may be referred to as a buck-boost converter region circuit, if necessary. In this case, the elements of the buck-boost converter region 100A may include the switches $M_A$, $M_B$, $M_C$, and $M_D$, the two Schottky diodes which are each applied with a voltage of 5 V, the two capacitors $C_{B1}$ and $C_{B2}$, the sense resistor $R_{SENSE}$, and the output capacitor $C_{OUT}$.

Figure 2:
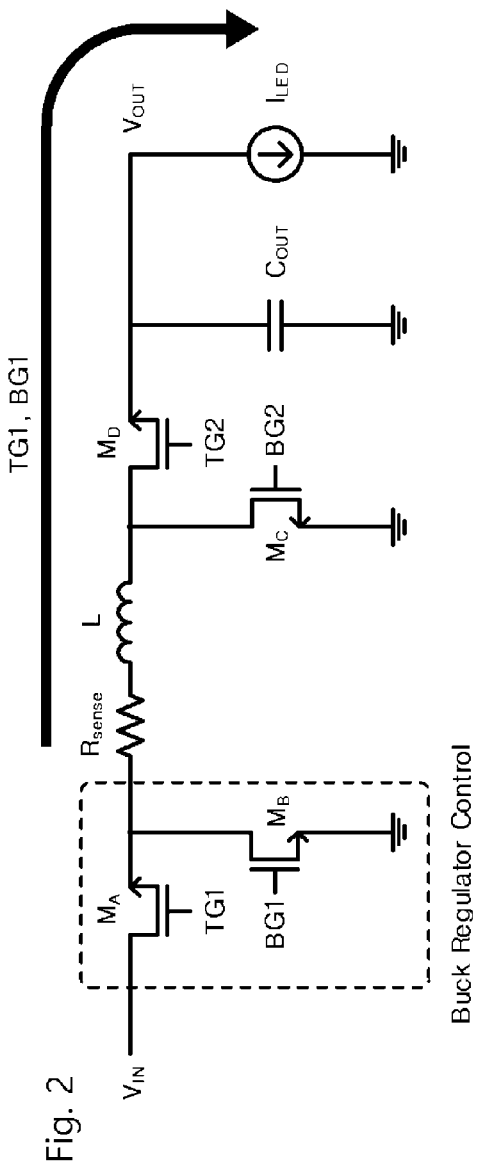
FIG. 2 is a circuit diagram for describing an operation in a buck mode according to an embodiment of the present disclosure.

For example, as illustrated in FIG. 2, when the buck-boost converting circuit 100 according to an embodiment of the present disclosure operates in the buck mode, the switches $M_A$ and $M_B$ are controlled in response to the control signals TG1 and BG1. In this case, a load current $I_{LED}$ is supplied by the inductor L regardless of control by the control signals TG1 and BG1.

Accordingly, when a ripple of the current of the inductor is sufficiently small, the buck-boost controller 110 may sufficiently operate as a current regulator although a separate output capacitor $C_{OUT}$ is not present in the buck mode.

Figure 3:
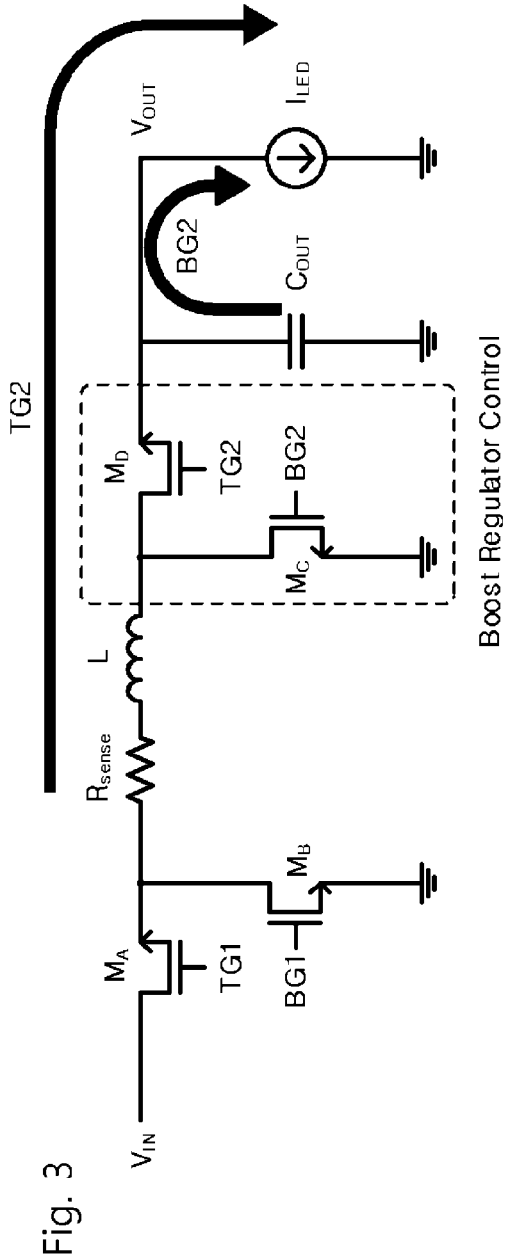
FIG. 3 is a circuit diagram for describing an operation in a boost mode according to an embodiment of the present disclosure.

In contrast, as illustrated in FIG. 3, when the buck-boost converting circuit 100 according to an embodiment of the present disclosure operates in the boost mode, the switches $M_D$ and $M_C$ are controlled by the control signals TG2 and BG2.

When the control signal TG2 is enabled, the load current $I_{LED}$ may be supplied by the current of the inductor. In contrast, when the control signal BG2 is enabled, only the output capacitor $C_{OUT}$ become sole means capable of maintaining the load current $I_{LED}$.

Accordingly, the buck-boost controller 110 cannot operate as a current regulator if a separate output capacitor $C_{OUT}$ is not present in the boost mode.

An operation of each of the elements of the LED current regulator region 100B may be better understood with reference to further detailed drawings.

Figure 4:
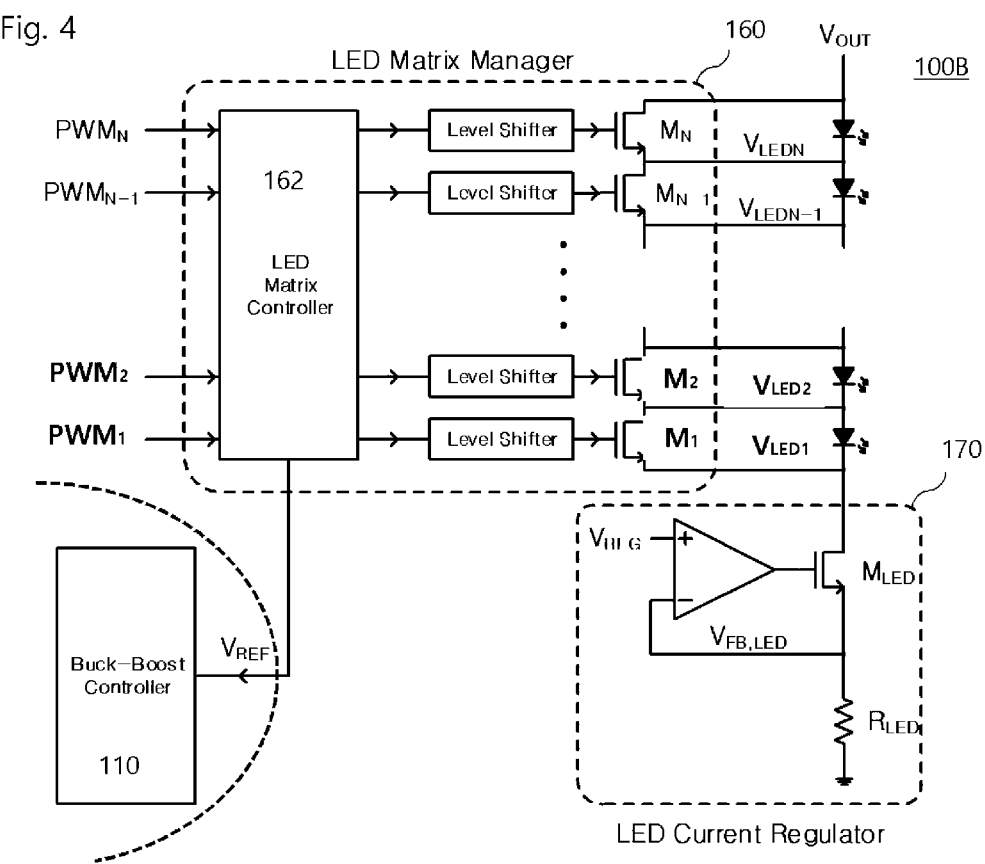
FIG. 4 is a circuit diagram of an LED current regulator region.

FIG. 4 illustrates a proper example in which the LED current regulator region 100B is configured.

The PWM generator 161 is not illustrated, but only outputs thereof are illustrated in FIG. 4 for convenience sake. The PWM generator 161 is configured to provide, as outputs, PWM signals corresponding to the LEDs, respectively.

The LED matrix manager circuit 160 is configured in the LED current regulator region 100B. The LED matrix manager circuit 160 applies outputs $V_{LED1}$ to $V_{LEDN}$ to a plurality of LEDs connected in series, respectively, and adjusts the voltages applied to the LEDs, respectively.

As illustrated in FIG. 4, the plurality of LEDs connected in series and the outputs $V_{LED1}$ to $V_{LEDN}$ of the LED matrix manager circuit 160 each have a mutually traversal and longitudinal connection state. Therefore, it is to be noted that a term "matrix" is used to easily describe the plurality of LEDs and the outputs $V_{LED1}$ to $V_{LEDN}$ of the LED matrix manager circuit 160 in an embodiment of the present disclosure because they may appear like a matrix.

The LED matrix manager circuit 160 includes the bypass switches $M_1$ to $M_N$ each configured as an MOS transistor for adjusting voltages of both ends of each LED, level shifters coupled to the gate terminals of the MOS transistors in order to adjust operating states of the bypass switches $M_1$ to $M_N$, respectively, an LED matrix controller 162 configured to adjust operations of the level shifters, etc.

The LED matrix controller 162 receives outputs of the PWM generator 161, that is, the PWM signals $PWM_1$ to $PWM_N$, and an operation of the LED matrix controller 162 is controlled by the PWM generator 161.

Although indicated as $I_{LED}$ in other drawings, the LED current regulator to which reference numeral 170 is assigned in FIG. 4 may be included as one element of the LED current regulator region 100B.

For example, one circuit that specifically implements the LED current regulator 170 may be configured to include a comparator configured to receive, as two inputs, a regulation voltage $V_{REG}$ received from the outside and a feedback voltage $V_{FB,LED}$ from an LED, a source follower transistor $M_{LED}$, and a source resistor $R_{LED}$, and may properly regulate currents flowing into the plurality of LEDs, that is, an LED current.

A detailed method of regulating, by the LED current regulator 170, the LED current is described below.

When the LED current received from the plurality of LEDs is increased, a voltage applied to the source resistor $R_{LED}$, that is, the feedback voltage $V_{FB,LED}$, is also increased.

When the feedback voltage $V_{FB,LED}$ is increased, a difference $V_{REG}$-$V_{FB,LED}$ between the two input voltages of the comparator is decreased. The decreased difference $V_{REG}$-$V_{FB,LED}$ between the two input voltages lowers the output voltage of the comparator. As a result, a voltage difference between a gate and source of the source follower transistor $M_{LED}$ is decreased. Therefore, the LED current is decreased.

In contrast, when the LED current received from the plurality of LEDs is decreased, a voltage applied to the source resistor $R_{LED}$, that is, the feedback voltage $V_{FB,LED}$, is also decreased.

When the feedback voltage $V_{FB,LED}$ is decreased, the difference $V_{REG}$-$V_{FB,LED}$ between the two input voltages of the comparator is increased. The increased difference $V_{REG}$-$V_{FB,LED}$ between the two input voltages raises the output voltage of the comparator. As a result, a voltage difference between the gate and source of the source follower transistor $M_{LED}$ is increased. Therefore, the LED current is increased.

As a result, the LED current regulator 170 performs a regulation operation so that the LED current falls within a given range.

An increase or decrease in the LED current received from the plurality of LEDs may occur when the bypass switches $M_1$ to $M_N$ coupled to both ends of the LEDs are turned on or off in order to adjust the turn-on or turn-off of the LEDs.

Furthermore, since the role of the source follower transistor $M_{LED}$ as a current source is important, it is preferred that the LED current regulator 170 is properly controlled to always operate in a saturation region, not a triode region.

To this end, the LED matrix controller 162 includes a circuit for controlling a reference voltage $V_{REF}$ to belong to a voltage value range preset by a manufacturer. A reference voltage control logic circuit 162A of FIG. 6 and a reference voltage bias circuit 162B of FIG. 7 correspond to such circuits. Operations of the circuits are described later with reference to FIGS. 6 and 7.

Figure 5:
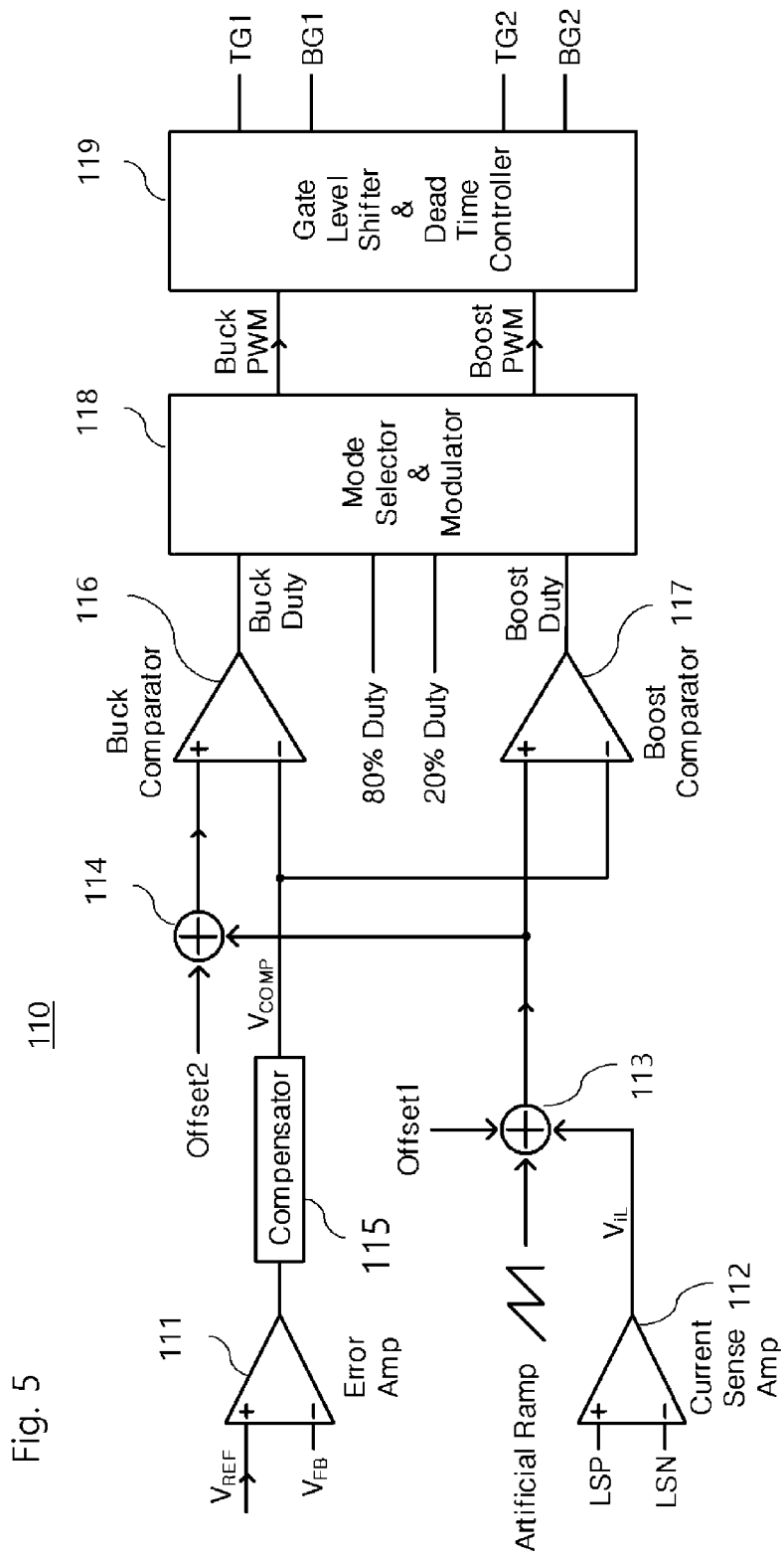
FIG. 5 is a circuit diagram illustrating an embodiment of a buck-boost controller.

FIG. 5 illustrates an example of detailed elements of the buck-boost controller 110. The buck-boost controller 110 uses a current mode control method using a current of the inductor.

An error amplifier 111 compares the feedback voltage VFB with the reference voltage $V_{REF}$ received from the LED matrix manager 160. A result of the comparison of the error amplifier 111 is provided to a compensator 115. The compensator 115 may be used to obtain a duty reference signal $V_{COMP}$ so that a feedback loop is not unstable. The duty reference signal $V_{COMP}$ is a criterion for producing the duty of the buck-boost controller 110.

Furthermore, the buck-boost controller 110 uses the current mode control method, and thus detects a current flowing into the inductor L by amplifying a difference between the voltages LSP and LSN of both ends of the sense resistor $R_{SENSE}$.

The difference between the voltages LSP and LSN is output as a signal of a voltage $V_{iL}$ through a current sense amplifier 112. The voltage $V_{iL}$ is added to an artificial ramp, that is, a signal for suppressing sub-harmonic oscillation, and an offset signal Offset1 for preventing a sudden change that occurs when the boost mode is changed.

A boost comparator 117 compares a signal, added by an adder 113, with the duty reference signal $V_{COMP}$ of the compensator 115.

Furthermore, another adder 114 adds the signal, added by the adder 113, to another offset signal Offset2 for preventing a sudden change in the buck mode. A buck comparator 116 compares a signal, added by the another adder 114, with the duty reference signal $V_{COMP}$ of the compensator 115.

Through the operation, the buck comparator 116 generates a buck duty, and the boost comparator 117 generates a boost duty.

The buck duty and the boost duty are transmitted to a mode selector & modulator 118. The mode selector & modulator 118 selects a mode suitable for an input to the buck-boost controller 110 and a state of the output voltage based on the buck duty and the boost duty, and generates PWM voltages suitable for the respective modes, that is, signals Buck PWM and Boost PWM.

The generated two PWM voltages Buck PWM and Boost PWM are transmitted to a gate level shifter & dead time controller 119. The gate level shifter & dead time controller 119 generates the control signals TG1, TG2, BG1, and BG2 for controlling the switches $M_A$ to $M_D$. The control signals TG1, TG2, BG1, and BG2 is for controlling the output voltage $V_{OUT}$ of the buck-boost converter region 100A.

Through the control operation and the feedback operation described above, the feedback voltage $V_{FB}$ generated by a voltage division for the feedback resistors of the buck-boost converter region 100A follows the reference voltage $V_{REF}$ generated from the LED matrix manager.

As a result, the output voltage $V_{OUT}$ of the buck-boost converter region 100A is controlled by a series of operations of a PWM value, that is, the PWM signal, and the reference voltage $V_{REF}$.

According to an embodiment of the present disclosure, a voltage of an LED according to the ON/OFF of the LED and a regulated output of the LED current can be obtained by the operations of the LED matrix manager 160 and the buck-boost controller 110.

If six LEDs are connected in series, a voltage difference between both ends of the six LEDs connected in series may be indicated as $V_{LED6}$-$V_{LED1}$.

Illustratively, in the state in which the six LEDs are connected in series and are all turned on, when one of the six LEDs is turned off by turning on one of the bypass switches, the voltage difference $V_{LED6}$-$V_{LED1}$ between both ends of the six LEDs suddenly decreases. The voltage $V_{LED1}$ applied to the source follower transistor $M_{LED}$ is increased. However, since the output voltage $V_{OUT}$ is subsequently decreased in the buck-boost converter region 100A, the voltage $V_{LED1}$ applied to the source follower transistor $M_{LED}$ may return back to the original voltage.

In contrast, illustratively, if one or more of the six LEDs connected in series is turned off and another LED is further turned on, the voltage $V_{LED1}$ applied to the source follower transistor $M_{LED}$ is decreased, and there is concern that the source follower transistor $M_{LED}$ may operate in the triode region. Accordingly, the voltage difference $V_{LED6}$-$V_{LED1}$ between both ends of the six LEDs suddenly rises because the output voltage $V_{OUT}$ is previously raised in the buck-boost converter region 100A before the voltage difference is increased. Therefore, although the voltage $V_{LED1}$ applied to the source follower transistor $M_{LED}$ is instantly decreased, the source follower transistor $M_{LED}$ maintains a saturation state. Thereafter, the LED current may be controlled to be constantly maintained through a process of returning the voltage $V_{LED1}$, applied to the source follower transistor $M_{LED}$, to its original voltage.

Accordingly, according to an embodiment of the present disclosure, the LED current regulator 170 is controlled not to operate in the triode region, and the reference voltage $V_{REF}$ fed back to the buck-boost controller 110 is changed in response to the input of an external PWM signal. Therefore, according to an embodiment of the present disclosure, the output voltage $V_{OUT}$ can be changed based on the sum of forward bias voltages of LEDs that are turned on.

Figure 6:
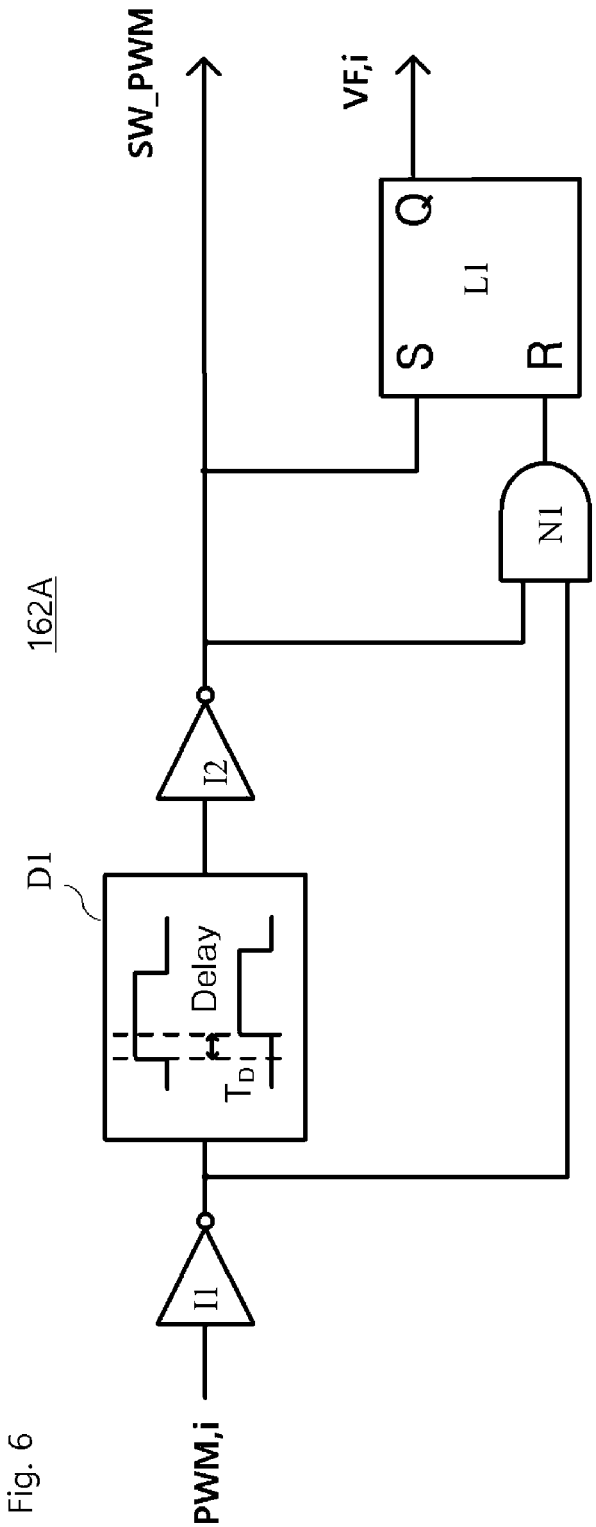
FIG. 6 is a circuit diagram of a reference voltage control logic circuit.
Figure 7:
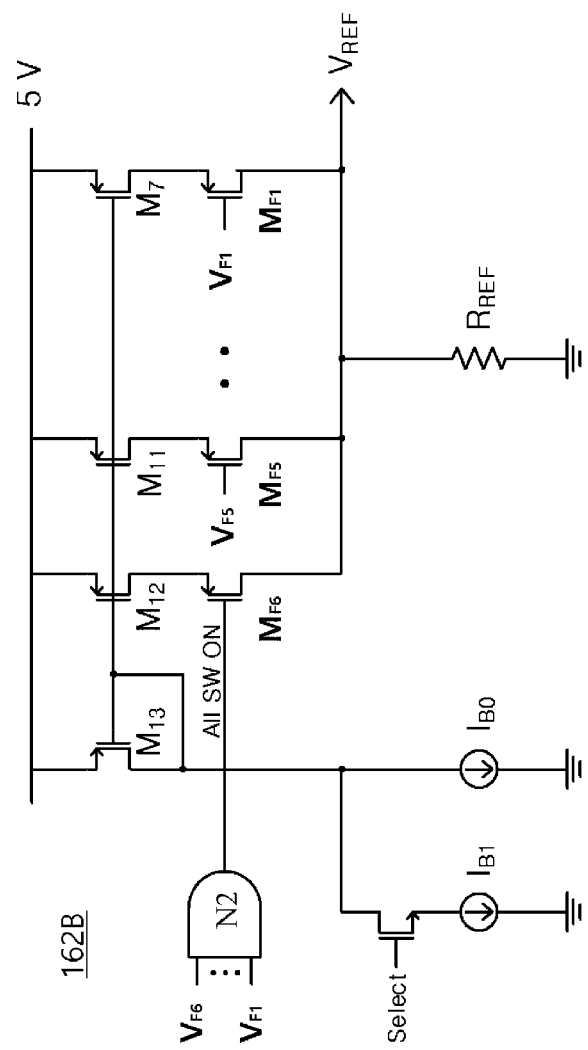
FIG. 7 is a circuit diagram of a reference voltage bias circuit.

According to an embodiment of the present disclosure, for the aforementioned control, the LED matrix controller 162 may include the reference voltage control logic circuit 162A of FIG. 6 and the reference voltage bias circuit 162B of FIG. 7 for controlling the reference voltage $V_{REF}$ to be maintained within a voltage value range preset by a manufacturer.

The reference voltage control logic circuit 162A of FIG. 6 receives a PWM signal PWM,i, that is, an output signal generated by the PWM generator 161. In this case, the PWM signal PWM,i means that a signal "i" has been assigned to indicate a given one bit of N bits forming the PWM signals $PWM_1$ to $PWM_N$, for example. In all of the following signals or circuits, a subscript "i" is used as the same meaning.

Furthermore, for example, if N=6, this means one of the PWM signals $PWM_1$ to $PWM_6$ having 6 bits. Furthermore, if N=6, this means that a circuit configuration, such as FIG. 6, may be repeated six times to form one block. The PWM signal PWM,i input to the reference voltage control logic circuit 162A is generated as a delayed signal SW_PWM through two inverters I1 and I2 and a delay circuit D1. The delayed signal SW_PWM and a signal passing through the inverter I1 are provided to an AND gate N1. The output of the AND gate N1 is input to a latch L1 as a reset signal. The latch L1 generates a signal $V_{F,i}$ that operates during a timing section in which input signals overlap. The signal $V_{F,i}$ may be understood as an enable sense signal obtained by detecting an activation state of the PWM signal PWM,i.

The delayed signal SW_PWM is transmitted to the level shifter of the LED matrix manager circuit 160. Furthermore, the signal $V_{F,i}$ of the latch L1 is transmitted to the reference voltage bias circuit 162B of FIG. 7.

If N=6, output signals of the reference voltage control logic circuit 162A of FIG. 6 corresponding to the PWM signals $PWM_1$ to $PWM_6$ having 6 bits may be defined as $V_{F1}$ to $V_{F6}$, respectively.

In the reference voltage bias circuit 162B illustrated in FIG. 7, the output signals $V_{F1}$ to $V_{F6}$, that is, activation sense signals, in the reference voltage control logic circuit 162A of FIG. 6 are input to PMOS transistors $M_{F1}$ to $M_{F6}$ constituting a current mirror, respectively. In this case, it is to be noted that the output signals $V_{F1}$ to $V_{F6}$ have the same properties and are generated by the six reference voltage control logic circuits 162A that are identically repeated. Accordingly, the amounts of currents of current sources $I_{B0}$ and $I_{B1}$ are controlled in response to a selection signal "Select." The reference voltage $V_{REF}$ properly adjusted by an AND gate N2 that operates when the output signals $V_{F1}$ to $V_{F6}$ overlap is generated.

For example, assuming that six LEDs are connected in series, when all of the six LEDs are turned on, the reference voltage $V_{REF}$ may be represented by Equation 2 below, $$V_{REF}=(I_{M7}= \ldots =I_{M12}+1_{M13}) \times R_{REP} \qquad (2)$$

wherein each current means a drain current of each of the PMOS transistors constituting the current mirror.

Furthermore, in the reference voltage bias circuit illustrated in FIG. 7, the dimensions (W/L) of each of the PMOS transistors of the current mirror may be represented by Equation 3 below, $$\left(\frac{W}{L}\right)_{M_7} = \ldots = \left(\frac{W}{L}\right)_{M_{12}} = \frac{3}{2} \cdot \left(\frac{W}{L}\right)_{M_{13}} \qquad (3)$$

wherein W and L indicate the gate width and length of each MOS transistors, respectively.

The researchers of the present disclosure have found that, when the dimensions of the transistors were determined as in Equation 3, a current flowing into a reference resistor $R_{REF}$ was decreased by about 15% whenever one of the six LEDs was turned off from timing at which all the LEDs were turned on.

Such a decrease is determined by the on/off states of the transistors $M_{F1}$ to $M_{F6}$ constituting the current mirror in response to the output signals $V_{F1}$ to $V_{F6}$.

Furthermore, a transistor $M_{13}$ constituting the current mirror determines the DC offset of the reference voltage. The DC offset is used to secure a sufficient voltage $V_{LED1}$ for a smooth operation of the LED current regulator, and occupies about 10% of a current flowing into the reference resistor $R_{REF}$ when all of the LEDs are turned on. Reference may be made to the aforementioned experimental values if the number of LEDs connected in series is changed.

It is preferred to prevent a situation in which all currents flow into only the bypass switches when all of the six LEDs are turned off. For such an operation, when all of the six LEDs are turned on, the reference voltage $V_{REF}$ is made to converge on 0 V using a method of removing the DC offset of the reference voltage $V_{REF}$ by applying a signal "All SW ON" to the transistor $M_{F6}$ through the AND gate N2.

Next, the output voltage $V_{OUT}$ of the buck-boost converter region 100A is decreased by stopping an operation of the buck-boost controller 110. If the reference voltage $V_{REF}$ does not become 0 V in the state in which the operation of the buck-boost controller 110 is stopped, a phenomenon occurs in which a voltage of the duty reference signal $V_{COMP}$, that is, an input to the comparator, continues to rise due to the error amplifier 111. This may result in a problem in that the circuit malfunctions due to an excessive input voltage of the comparator when the buck-boost controller 110 subsequently operates again.

In order to prevent the problem, it is preferred that an operation for decreasing the reference voltage $V_{REF}$ through the signal "All SW ON" is first performed before the operation of the buck-boost controller 110 is stopped.

Through such an operation, the LED current regulator 170 no longer generates an output current because the voltage $V_{LED1}$ is sufficiently low. Accordingly, the unnecessary power consumption can be prevented, which occurs because the output current is simply wasted through the bypass switches when all of the LEDs are turned off.

A forward bias voltage of an LED may be different depending on the amount of current flowing into the LED, a temperature of the LED, the type of LED, etc. For this reason, if a level of the reference voltage $V_{REF}$ has one fixed value, an error may occur in a change in the output voltage, which may have an adverse effect on an operation of the LED current regulator 170.

If the forward bias voltage of the LED differs from a change in an actual output voltage, power consumption of the LED current regulator 170 is increased because the voltage $V_{LED1}$ according to the last LED among LEDs connected in series becomes higher than a reference value, or a drain voltage of the transistor $M_{LED}$ is not sufficiently secured because the voltage $V_{LED1}$ according to the last LED becomes lower than the reference value.

In this case, there is concern that the source follower transistor $M_{LED}$ may operate in the triode region.

Accordingly, as in the circuit of FIG. 7, a bias current of the reference voltage bias circuit 162B is adjusted by applying the external selection signal thereto, and a change in the output voltage is trimmed based on a forward bias voltage of an LED that varies depending on a condition.

The voltage $V_{LED1}$ that can prevent the transistor $M_{LED}$ of the LED current regulator 170 from operating in the triode region and also minimize power consumption may be selected by selecting a proper change in the output voltage.

The circuit of FIG. 7 is an implementation example in which a bias current of the reference voltage bias circuit 162B is adjusted using a 1-bit signal. In this case, a change in the output voltage can be more finely adjusted by adding a current bias in addition to the currents of the current sources $I_{B0}$ and $I_{B1}$ and adjusting the bias current.

As described above, according to an embodiment of the present disclosure, a plurality of LEDs can be individually controlled by using the LED current regulator and the circuit capable of operating in the buck-boost mode in a structure in which the LEDs are connected in series.

Furthermore, as described above, according to an embodiment of the present disclosure, a current flowing into a plurality of LEDs connected in series can be properly regulated depending on the on or off state of an LED, and unnecessary power consumption can be prevented although all of the LEDs are turned off.

Embodiments of the present disclosure have an advantage in that a plurality of LEDs connected in series can be individually controlled.

Furthermore, embodiments of the present disclosure have an advantage in that a current flowing into a plurality of LEDs connected in series can be properly regulated depending on the on or off state of an LED.

Furthermore, embodiments of the present disclosure have an advantage in that unnecessary power consumption can be prevented although all of a plurality of LEDs connected in series are turned off.

What is claimed is:

1. A buck-boost converting circuit comprising:
a plurality of light-emitting diodes (LEDs) connected in series;
an LED matrix manager comprising bypass switches one-to-one corresponding to the respective LEDs and each bypass switch coupled to both ends of a corresponding LED, and an LED matrix controller configured to control switching of the bypass switches in response to pulse width modulation (PWM) signals via a PWM generator, respectively;
a buck-boost converter region circuit comprising a buck-boost controller configured to supply an output voltage to the plurality of LEDs in accordance with a buck mode and a boost mode; and
an LED current regulator configured to control currents flowing into the plurality of LEDs.

2. The buck-boost converting circuit of claim 1, wherein the LED matrix manager comprises:
the bypass switches each configured to adjust voltages of both ends of a corresponding LED;
level shifters configured to adjust operating states of the bypass switches, respectively; and
the LED matrix controller configured to adjust operations of the level shifters in response to the PWM signals corresponding to the LEDs, respectively.

3. The buck-boost converting circuit of claim 1, wherein the buck-boost converter region circuit comprises:
the buck-boost controller configured to control the buck mode and the boost mode; and
elements configured to provide the output voltage corresponding to an input voltage in the buck mode or the boost mode under a control of the buck-boost controller.

4. The buck-boost converting circuit of claim 3, wherein the elements comprise:
an inductor;
buck mode switches configured in one end of the inductor and configured to supply a load current through the inductor in response to the input voltage in the buck mode;
boost mode switches configured in the other end of the inductor and configured to supply the load current based on a current of the inductor in the boost mode;
a sense resistor configured to detect a current flowing into the inductor; and
an output capacitor to which the output voltage corresponding to the load current is applied.

5. The buck-boost converting circuit of claim 3, wherein:
the LED matrix manager provides a reference voltage controlled to belong to a preset range, and
the buck-boost controller controls the elements in accordance with the buck mode and the boost mode using the reference voltage so that the LED current regulator operates in a saturation region.

6. The buck-boost converting circuit of claim 5, wherein:
the LED matrix manager comprises the LED matrix controller, and
the LED matrix controller
provides delayed signals to the level shifters in response to the PWM signals, respectively; and provides the reference voltage, belonging to the preset range and controlled to correspond to the number of LEDs that are turned off, in response to the PWM signals.

7. The buck-boost converting circuit of claim 6, wherein:
the LED matrix controller comprises reference voltage control logic circuits and a reference voltage bias circuit, and controls the reference voltage to belong to a range of a preset voltage value,
the reference voltage control logic circuits correspond to the PWM signals, respectively, delay the PWM signals, output the delayed signals to the level shifters, respectively, and output, to the reference voltage bias circuit, enable sense signals obtained by detecting the PWM signals, and
the reference voltage bias circuit provides the reference voltage having a level corresponding to the received enable sense signals.

8. The buck-boost converting circuit of claim 7, wherein the reference voltage bias circuit provides the reference voltage converging on a preset low voltage before an operation of the buck-boost controller is stopped when all of the plurality of LEDs are turned off.

9. The buck-boost converting circuit of claim 8, wherein the reference voltage converges on 0 V by the reference voltage bias circuit.

10. The buck-boost converting circuit of claim 7, wherein the reference voltage bias circuit generates the reference voltage using a current mirror.

11. The buck-boost converting circuit of claim 3, wherein the buck-boost controller provides control signals for controlling the elements in accordance with a selected mode of the buck mode and the boost mode, based on a result of a comparison between the reference voltage and a feedback voltage of the output voltage and a voltage sensed by a sense resistor coupled to an inductor for supplying a load current to the plurality of LEDs.

12. The buck-boost converting circuit of claim 11, wherein the buck-boost controller comprises:
an error amplifier configured to compare the feedback voltage and the reference voltage;
a current sense amplifier configured to amplify a difference between voltages of both ends of the sense resistor;
a first adder configured to add an artificial ramp which is a signal for suppressing sub-harmonic oscillation of the current sense amplifier and a first offset signal for preventing a sudden change that occurs when the boost mode switches;
a second adder configured to add an output of the first adder and a second offset signal for preventing a sudden change that occurs in the buck mode;
a buck comparator configured to output a buck duty by comparing a result of the comparison between the feedback voltage and the reference voltage and an output of the second adder; and
a boost comparator configured to output a boost duty by comparing a result of the comparison between the feedback voltage and the reference voltage and an output of the first adder,
wherein the mode is selected as the buck duty and the boost duty, and the control signals suitable for the mode are generated.

13. The buck-boost converting circuit of claim 12, wherein:
the buck-boost controller further comprises a compensator,
the compensator outputs a duty reference signal obtained by compensating an output of the error amplifier so that a feedback loop is not unstable, and
the duty reference signal is provided to the buck comparator and the boost comparator.

14. The buck-boost converting circuit of claim 12, wherein the buck-boost controller further comprises:
a mode selector & modulator configured to select the mode as the buck duty and the boost duty and generate a PWM voltage suitable for the mode; and
a gate level shifter & dead time controller configured to generate the control signals in response to the PWM voltage of the mode selector & modulator.

15. The buck-boost converting circuit of claim 14, wherein the comparator controls the source follower transistor to operate in a saturation region.

16. The buck-boost converting circuit of claim 1, wherein the LED current regulator comprises:
a comparator configured to receive an external regulation voltage and a feedback voltage as two inputs from the plurality of LEDs;
a source follower transistor configured to act as a current source for the plurality of LEDs; and
a source resistor,
wherein an output voltage of the comparator is changed in response to an increase or decrease in the feedback voltage applied to the source resistor, which corresponds to an increase or decrease in currents of the plurality of LEDs, and
a current of the source follower transistor is increased or decreased in response to a change in the output voltage of the comparator.

17. A buck-boost converting circuit configured to provide an output voltage, corresponding to a buck mode or a boost mode, to a plurality of light-emitting diodes (LEDs) connected in series in response to control signals, the buck-boost converting circuit comprising:
an LED matrix manager comprising bypass switches one-to-one corresponding to the respective LEDs and each bypass switch coupled to both ends of a corresponding LED, and an LED matrix controller configured to control switching of the bypass switches in response to PWM signals via a PWM generator, respectively, and provide a reference voltage belonging to a preset range; and
a buck-boost controller configured to provide control signals for controlling the buck mode and the boost mode using the reference voltage so that the LED current regulator provides the output voltage for enabling the LED current regulator to operate in a saturation region.

18. The buck-boost converting circuit of claim 17, wherein:
the LED matrix manager comprises:
the bypass switches each configured to adjust voltages of both ends of a corresponding LED;
level shifters configured to adjust operating states of the bypass switches, respectively; and
the LED matrix controller configured to adjust operations of the level shifters in response to the PWM signals corresponding to the LEDs, respectively,
the LED matrix controller
provides delayed signals to the level shifters in response to the PWM signals, respectively; and provides the reference voltage, belonging to the preset range and controlled to correspond to the number of LEDs that are turned off, in response to the PWM signals.

19. The buck-boost converting circuit of claim 18, wherein:
   the LED matrix controller comprises reference voltage control logic circuits configured to control the reference voltage to belong to a range of a preset voltage value, and a reference voltage bias circuit,
   the reference voltage control logic circuits correspond to the PWM signals, respectively, delay the PWM signals, output the delayed signals to the level shifters, respectively, and output, to the reference voltage bias circuit, enable sense signals obtained by detecting the PWM signals, and
   the reference voltage bias circuit provides the reference voltage having a level corresponding to the received enable sense signals.

20. The buck-boost converting circuit of claim 17, wherein the buck-boost controller provides control signals for controlling elements in accordance with a selected mode of the buck mode and the boost mode based on a result of a comparison between a feedback voltage of the output voltage and the reference voltage and a voltage obtained by detecting currents supplied to the plurality of LEDs.

* * * * *